United States Patent Office 3,244,527
Patented Apr. 5, 1966

3,244,527
CATTLE FEEDING PROCESS, COMPOSITIONS
AND PRODUCT
Joe H. Baker, Dalhart, Tex., assignor of ten percent to
Jay Taylor, five percent to Elsie Brown Silverman, one
and one hundred fifty-four thousandths percent to Johnnie D. Tinnin, twenty percent to Robert F. and Alma E.
Brandenburg, as joint tenants, and ten percent to Coldwater Cattle Co., Inc., all of Amarillo, five percent to
Billy D. Freeman, Dalhart, and ten percent to Anderson, Clayton & Co., Abilene, Tex.
No Drawing. Filed July 1, 1964, Ser. No. 379,746
13 Claims. (Cl. 99—2)

This invention relates to improved cattle feed compositions, the use thereof and an improved beef product produced thereby.

Current knowledge of the carbohydrate, fat and protein requirements of cattle are met by concentrated feeds such as grain sorghum meal and alfalfa meal which are consistent and predictable as to their chemical constituents and physical characteristics. The roughage component heretofore deemed needed by cattle has been irregular, not only in quality of chemical composition but also in physical quality. The roughage function is critical for cattle to gain; however, conventional roughages are not predictable or stable in regard to their additional food nutrients, their mineral content, their vitamin content or their physical characteristics such as strength, bulk and dimension, and are not readily amenable to mechanical handling.

One object of this invention is to provide improved cattle feed compositions.

Another object of this invention is to provide a complete animal feed, all of which is amenable to automatic handling.

Another object of this invention is to provide an improved process for elimination of certain micro-organisms from the gastrointestinal tracts of cattle.

Yet another object of this invention is to provide a meat product of improved flavor and quality.

Other objects of this invention will be apparent to those skilled in the art on the study of the below specification.

Broadly, the cattle feed compositions of this invention comprise heavy grain rations without conventional roughage. These feed compositions are used, according to the process of this invention, to produce another product, meat of improved characteristics, within the scope of this invention. More particularly, this invention relates to the substitution of material of known composition and physical characteristics for the usual roughage in cattle feed compositions: these new cattle feed compositions provide for improved gain, feed conversion ratio and improved health of the cattle fed thereby, as well as improved control of nutrients and improved control of the beef produced thereby.

In a preferred embodiment of this invention a grain feed is made up with a composition as in Table I attached hereto; this ration provides a substantial portion of amorphous hydrated silica of predetermined size and shape characteristic which substitutes for the conventional feed roughages.

Such silica is inert in the digestive tract of beef cattle, i.e., it does not react with the components of the feed nor of the chemicals treated in the digestive tract. This is borne out by that the entire amount of silica fed in the rations hereindescribed are found in the feces of the animal.

In finishing cattle of conventional stock it is generally known that the weight of cattle increases more rapidly than their volumetric capacity for feed. Consequently, it is usually necessary to reduce the roughage from time to time in order to maintain the level of grain consumption of at least 1.5 percent of the live weight. However, it has been generally felt that the reduction of roughage to a weight below 0.5 percent of the live weight is not justified since such decreases in roughage usually have little effect upon the consumption of grain and, more dangerously, eliminate rumination and invite the production of bloat in cattle. Bloat is generally believed to be due to some dysfunction of the eructating mechanism. If the eructating mechanism is working normally, the animal can thereby expel more gas than can be expected to form in the cattle's rumen under normal feeding conditions.

The feed composition provided according to this invention also provides amounts of vitamins A and D, calcium, potassium and phosphorous. Attention also is called to the relation between magnesium and calcium provided in the composition herewith provided. Additional to the substantial amount of vitamin D provided, all the other fat-soluble vitamins A, B, E and K are included. A particularly large amount of phosphorous, such as 25 pounds per ton of total feed in one formula according to this invention, is to provide a balance between the inorganic phosphorous and the organic phosphorous in the grain. The composition according to this invention provides that 60 percent of the phosphorous in the feed will be inorganic and 40 percent will be organic, as the presence of vitamin D provided by these formulas permits that organic phosphorous may be substituted for inorganic phosphorous.

It is pointed out that the feeds of this invention permit straight grains to be used, i.e., with the grains used as the chief volumetric constituent of the feed, in combination with the silicon hydrate rich composition of this invention. The amorphous hydrated silica has a sieve analysis of 100 percent through a U.S. #10 sieve; 30 percent retained on a U.S. #30 sieve; 60 percent retained on a U.S. #40 sieve; and 100 percent retained on a U.S. #50 sieve. This is a high-grade, white silica which is hard, rounded and smooth-surfaced with an American Foundry Society grain fineness of 27, as from the Ottawa district of Illinois. If the silica is coarser than the above range it will not be accepted by cattle: if the silica is smaller in size it is not effective.

TABLE I.—CONCENTRATE AND SILICA
RATION FORMULA

This formula is fed at the rate of 1 pound per day of this formula with 9 pounds of milo per 400 pounds of animal weight; i.e., 200 pounds of this formula is mixed with 1800 pounds of milo to form each ton of total feed mixture; and 10 pounds of the resultant total mixture is fed per 400 pounds of animal weight.

| Item | | Weight |
|---|---|---|
| Vitamin $D_2$ (80,000,000 int'l units) | lb | 1 |
| Vitamin K | lb | 1 |
| Vitamin A250 (113,400,000 U.S.P. units) | lb | 1 |
| Copper sulfate | lb | ¼ |
| Flavor | lb | ½ |
| Iodine | grams | 60 |
| Urea | lbs | 240 |
| $SiO_2$ | lbs | 633 |
| Dicalcium phosphate | lbs | 180 |
| Yeast | lbs | 21 |
| Salt | lbs | 100 |
| Magnesium sulfate | lbs | 3 |
| Choline | lb | 1 |
| KCl | lbs | 20 |

TABLE I.—(Continued)

| Item | | Weight |
|---|---|---|
| Fat | lbs | 20 |
| Stilbosol | lbs | 10 |
| Sodium sulphate | lbs | 50 |
| Riboflavin | grams | 240 |
| Cottonseed meal (or soybean meal) | lbs | 710 |
| d-Pantothenic acid (as dl-calcium pantothenate calcium chloride complex) | milligrams | 13,900 |
| Niacin | do | 15,000 |
| Choline chloride | do | 37,500 |
| Vitamin A (as vitamin A palmitate) | U.S.P. units | 60,000,000 |
| Vitamin $D_2$ (as d-activated plant sterol) | Int'l chick units | 30,000,000 |
| Vitamin E (alpha tocopheryl acetate) | Int'l units | 45,000 |
| Manganese (as sulfate) | grams | 15 |
| Cobalt (as carbonate) | do | 1.7 |
| Copper (as carbonate) | do | 1.7 |
| Zinc (as oxide) | do | 10 |

The above ration is in the form of pellets or mash with molasses as binder.

The pH of the mixture of components exclusive of the milo, of the concentrate plus silica ration formula of Table I (20 grams of such mixture in 400 cc. of water) was 6.35; the pH of the entire mixture of 1 part by the formula of Table I plus 9 parts by weight of milo (20 grams of such entire mixture in 400 cc. of water) was 7.2 after boiling, 6.1 when unheated.

A total of 164.4 cc. of 0.100 N NaOH reacts with the total acid in a 20-gram sample of the components (exclusive of milo) of the concentrate plus silica formula of Table I.

While not being limited thereto it would appear and it is my present theory that the amorphous silica locates between the villi on the interior surface of the intestinal walls of the animal. The size of the silica particles is sufficiently small for them to locate between those villi and to roll in and out of the depressions between such villi, moved along the length of the intestine by peristaltic movement thereof and the mass of food and digestive juices in the intestinal lumen. The silica particles are smooth and round and readily roll and slide along the interior intestinal wall without harm to the intestinal membranes forming such wall. The walls of the intestine are, accordingly, mechanically cleansed by the action of such particles but are not harmed thereby. This cleansing action serves to mechanically remove excessive thicknesses of bacterial growth and succus entericus within the intestine. This removal of undesired bacterial growth and secretion is shown by that animals (before being placed on the feed rations compounded according to this invention) when ill or after several months on the conventional all-concentrate ration and slaughtered to determine their internal condition, showed liver abcesses and a thick, black, tarry lining on the interior of the small intestinal wall as in Lot 3 of Test I below described. Feeding of comparable test groups from the same lot as for Lots 1 and 4 of Test I below described according to the process of this invention resulted in elimination of such black deposit through the feces of the lot members and, as determined by inspection of the interior intestinal wall of such group after slaughter, elimination of the black deposit on the intestinal wall and the absence of abcessed liver and intestines.

In a particular demonstration of the utility of this invention, which demonstration is hereinbelow referred to as Test I, a group of 60 steer calves and yearlings of good market grade as in United States Department of Agriculture Circular 505, average age 8–9 months, average weight of 355 pounds, were randomly assigned to six lots of 10 animals each. Ten animals (Lot 5) were slaughtered at the beginning of the trial to represent initial body composition and condition. The other four groups were assigned to treatments according to the design of Table II. At the time of slaughter of the initial groups, all animals were changed to their respective assigned rations and the experimental feeding period started.

Test I

| | Lot #1 | Lot #2 | Lot #3 | Lot #4 | Lot #5 | Lot #6 |
|---|---|---|---|---|---|---|
| Days Fed: | | | | | Slaughter | |
| 20 | $SiO_2$+ Conc. Ration. Slaughter | $SiO_2$+ Conc. Ration. | Conc. Ration only. Slaughter | Conc. Ration only. (¹) | | $SiO_2$+ Conc. Ration. |
| | | Conc. Ration without $SiO_2$. Slaughter | | $SiO_2$+ Conc. Ration. | | |
| 134 | | | | Slaughter | | Slaughter. |
| Liver Scars | No | Yes | Yes | Yes | No | No. |
| Liver Abcess | No | Yes | Yes | No | No | No. |
| Carcass Grade | Choice | | | | | Choice. |

¹ Foundered and off feed.

The action of the silica appears to be not only on the bulk or volumetric characteristics of the feed but also on the in vivo metabolism of the carbohydrate. A very large amount of propionic and butyric acid relative to acetic acid is found in the rumen of the animals fed the silica-containing ration as shown in Table II as determined by rumen fluid samples (taken as in Wright and Pope, vol. 22, Journal of Animal Science, page 586, August 1963).

TABLE II.—TOTAL VOLATILE FATTY ACID

| Ration | Total | Acetic | Propionic | Butyric | Acetic: propionic ratio |
|---|---|---|---|---|---|
| Lot #1, Test I | 215 | 39.2 | 98.3 | 70.5 | 0.40:1 |
| Lot #3, Test I | 164 | 103 | 39.2 | 17.8 | 2.62:1 |

The flavor of the calves produced by Test Lots 1 and 6 is as good as that of older cattle due to the method of feeding. Additionally, the correlation of conventional tests (juiceness, panel tenderness, sheer, pH, marbling and ether extract) of the samples of meat from the group were in close quantitative correlation with only slight variation therebetween and illustrate the characteristic of the uniformity of the meat product of the animals fed according to the rations and schedules of this invention.

Animals receiving restricted levels of high concentrate were fed fed four times daily, and all animals fed ad libitum on both rations had free access to their rations at all times. Feeding continued for 134 days at which time the animals fed high concentrate ad libitum were judged to have reached choice slaughter grade.

The high-energy concentrate ration for Test 1 consisted of the following percent composition:

TABLE III

| | Percent |
|---|---|
| Sorghum (crushed), milo | 85 |
| Cottonseed or soybean meal | 3.4 |
| Blackstrap molasses | 5 |
| Mineralized salt | 6.56 |
| Vitamins and minerals as in Table I | .04 |

The chemical composition and energy content of the concentrate ration of Test I are shown in Table IV.

TABLE IV.—COMPARISON OF COMPOSITION OF THE RATIONS OF TEST I DRY MATTER BASIS

| Item | $SiO_2$ plus Conc. | High-Energy Concentrate |
|---|---|---|
| Crude protein, percent | 12.8 | 13.0 |
| Crude fiber, percent | 0 | 5.2 |
| $SiO_2$, percent | 3 | 0 |
| TDN, lb. per 100 lbs | 78 | [1] 79 |

[1] This TDN value is calculated generally as at page 57 of Applied Animal Nutrition by E. W. Crampton, W. H. Freeman and Company, San Francisco, 1956, and the value thereof taken from appendix 3, pages 442–443, Table Ap-6.

The animals are brought onto the feed of this invention from a conventional feed of shelled corn and oats, corn silage and alfalfa hay. When on the silica-containing feed concentrates of this invention such as in Table I the cattle do ruminate while they do not ruminate in the absence of the amorphous −10, +50 mesh silica-containing feed compositions of this invention.

While winter requirements for dry cows mature and in good flesh in the fall are not too critical, for short yearling calves the carotene content of feed, especially in absence of usual legumes with good green color, is critical. Further, the acidity is high in the rumen on high-energy feed due to the high carbohydrate concentration of such feeds, especially in the absence of rumination. Accordingly, a high vitamin A intake is required because vitamin A is destroyed in the acid fluid of the ruminate stomach.

Accordingly, in the process of feeding of this invention, the animals are also treated with a water solution of ethylene diamine dihydro iodide and of water-soluble vitamin A by dissolving in a drinking tank. The tank holds 500 gallons of water and is provided with 60 grams of ethylene diamine dihydro iodide and 45,000,000 units of vitamin A. This procedure provides for drinking and absorption by the animals of the supplemental vitamin A needed, notwithstanding the absence of legumes and the high acid concentration of the ruminate stomach during intake of the high-energy ration. The efficiency of this treatment is shown in the data of Tables V and VI.

The process of feeding using the feed of Table I and providing 1,000,000 units of vitamin A (as above described) per animal per day provides the result of Table VI.

The vitamin A solution is fed substantially entirely and at least in major part between feedings of the solid ration of Table I rather than consumed at time of feeding on the solid feed, in the same manner as cattle water at different times than they feed on pasture and in usual feed lot procedure where watering and feed equipment are spaced apart from each other. This difference in time of ingestion of vitamin A in solution and of solid feed as in Table I according to this invention facilitates absorption of the vitamin A and decreases the destruction thereof in the acid medium provided by the remaining concentrate feed in the rumen.

The amount of KCl may be as high as ½ pound per ton in the complete feed, i.e., be 50 pounds per ton of the formula of Table I. The KCl serves to suppress acid formation in the rumen.

The feed composition as in Table I provides 1420 Kcal. per pound (page 23, Nutrient Requirements of Beef Cattle, National Research Council, publication 1137, 1963); the average density of the feed used for the data of Tables V and I was 41.1 pounds per cubic foot.

The feed characteristics and gain results shown in Table VI were obtained using the same concentrate feed as used in Table V (i.e., rolled milo of 39 pounds per cubic foot density); used with conventional roughage (i.e., grain sorghum fodder or hay) of 11.7 pounds per cubic foot density. The cattle used for the tests of Tables V and VI were initially substantially the same as to grade and stock and condition and history.

As shown by the data of Tables V and VI the volume of feed consumed is substantially less by the process of this invention than by conventional methods (compare columns $f$ of Tables V and VI) and, although the T.D.N. is less in the operation of Table V (compare columns $g$ and $h$ of Tables V and VI), the average daily gain using the composition of Table I exceeded that of the conventional feeding, shown in Table VI, for all periods.

While finishing yearling and two-year old cattle frequently provides average daily gains of 2.7 pounds per day (page 2 of Nutrient Requirements of Beef Cattle, publication 1137), the feed conversion ratio is 8 pounds feed for one pound of gain, while the 3.2 pounds of gain per day is effected at only 6 pounds of feed per pound of gain by the process and compositions of this invention.

TABLE V.—RATION OF ALL GRAIN FEED WITH SILICA

| Period | Daily Ration | | | | | | g T.D.N.* Conc. | h T.D.N. Roughage | Total Therms* | | Average daily gain |
|---|---|---|---|---|---|---|---|---|---|---|---|
| | a Concentrate | b Concentrate | c Roughage | d Roughage | e Total | f Total | | | i | j | |
| | Wt., lbs. | Vol. cu. ft. | Wt., lbs. | Vol. cu. ft. | Wt., lbs. | Vol. cu. ft. | | | Conc. | Rough. | |
| Month #1 Average | 14.2 | .34 | 0 | 0 | 14.2 | .34 | 11.36 | 0 | 12.78 | | 2.72 |
| Month #2 Average | 15.94 | .39 | 0 | 0 | 15.94 | 0.39 | 12.75 | 0 | 14.34 | | 3.07 |
| Month #3 Average | 18.91 | .46 | 0 | 0 | 18.91 | 0.46 | 15.13 | 0 | 17.02 | | 3.46 |
| Month #4 Average | 21.6 | .52 | 0 | 0 | 21.6 | 0.52 | 17.28 | 0 | 19.44 | | 3.68 |

*Calculated on basis of 2,005 Kcal./lb., 80% T.D.N. and 0.90 therms N.E./lb. feed.

| Weights | Average | Range From— | Range To— |
|---|---|---|---|
| Initial | 565 | 540 | 590 |
| Final | 952 | 920 | 1,080 |
| Gain | 387 lbs. | | |
| Average Daily Gain | 3.22 lbs. | | |

TABLE VI.—RATION OF USUAL GRAIN FEED AND CONVENTIONAL ROUGHAGE, NO SILICA

| Period | Days | Daily Ration | | | | | | T.D.N.* Conc. 30-day avg. | T.D.N.* Roughage 30-day avg. | Total Therms* | | Average Daily Gain |
| | | a | b | c | d | e | f | g | h | i | j | k |
| | | Concentrate (Milo) | | Roughage | | Total | | | | | | |
| | | Wt. lbs. | Vol. cu. ft. | Wt. lbs. | Vol. cu. ft. | Wt. lbs. | Vol. cu. ft. | | | Conc. 30-day avg. | Roughage 30-day avg. | |
| Month #1 | 10 | 8.00 | .20 | 17.00 | 1.45 | 25.00 | 1.65 | 9.44 | 8.04 | 10.35 | 5.87 | 2.42 |
|  | 20 | 12.60 | .32 | 16.25 | 1.38 | 28.85 | 1.70 | | | | | |
|  | 30 | 14.00 | .36 | 15.00 | 1.28 | 29. | 1.64 | | | | | |
| Month #2 | 10 | 16. | .41 | 14.00 | 1.19 | 30. | 1.60 | 14.10 | 6.71 | 15.46 | 4.90 | 2.51 |
|  | 20 | 18. | .46 | 13.75 | 1.17 | 31.75 | 1.63 | | | | | |
|  | 30 | 19. | .48 | 12.60 | 1.08 | 31.60 | 1.56 | | | | | |
| Month #3 | 10 | 19.00 | .48 | 12.50 | 1.07 | 31.50 | 1.56 | 16.09 | 6.13 | 17.65 | 4.47 | 2.48 |
|  | 20 | 20.33 | .52 | 12.30 | 1.05 | 32.63 | 1.57 | | | | | |
|  | 30 | 21.00 | .53 | 12.00 | 1.02 | 33.00 | 1.55 | | | | | |
| Month #4 | 10 | 21.70 | .55 | 11.20 | .95 | 32.90 | 1.50 | 17.78 | 5.45 | 19.50 | 3.98 | 2.50 |
|  | 20 | 22.36 | .57 | 10.90 | .93 | 33.26 | 1.50 | | | | | |
|  | 30 | 22.60 | .58 | 10.60 | .90 | 33.20 | 1.48 | | | | | |
| Month #5 | 10 | 23.00 | .59 | 10.30 | .88 | 33.30 | 1.47 | 18.68 | 4.85 | 20.49 | 3.56 | 2.52 |
|  | 20 | 23.35 | .59 | 9.75 | .83 | 33.10 | 1.42 | | | | | |
|  | 30 | 23.70 | .60 | 9.20 | .78 | 32.90 | 1.38 | | | | | |

\* Calculated as for Table V.
Weights:
```
                Average
Initial_____   710
Final_____ 1,059
Gain_____   349
```

The criticality of silica is shown also by that when 50 head of cattle (yearling steers of initial average weight of about 600 pounds) were fed for 60 days a ration as in Table III and right-hand column of Table IV and containing additionally 40 pounds per ton of amorphous silica, slaughter after 60 days showed 16% with liver abcesses while another 50 head of the same group fed for 60 days the same ration but with 60 pounds per ton of feed, showed no abcesses but some scars. Additionally, another 1400 head of cattle fed the ration of Table III and 60 pounds per ton of silica showed NO liver abcess on slaughter.

This invention also comprises a novel composition for use in feeding cattle in a manner consistent with the above-discussed theory of operation of the amorphous silica. According to this invention amorphous silica as above described in column 2, lines 36–43 is fed to a mixer and 12 pounds of animal fat per 100 pounds of silica are added thereto and mixed therewith. The resultant mixture of animal fat and silica is readily accepted by feed cattle due to the flavor of the animal fat and is eaten independently of or with regular rations to provide up to 3% by weight of the total weight of feed consumed by each animal. The silica particles in such mixture act as above described. The amount of fat may vary from 5 to 15%; 10 to 15% is preferred. This silica-fat mixture may be used as a supplement separately fed or may be mixed into grain with usual supplement usually fed feed cattle to bring the total weight of amorphous silica fed to 3% by weight of the total weight of dry feed.

While silica particles and fat are the preferred separate feed supplement mixture, the use of other items appetizing to cattle in admixture with such silica is also included within the scope of this invention. Thus, 5¾ pounds of sodium chloride and 5¾ pounds of magnesium sulfate may be dissolved in 2 gallons of water and the resultant amorphous silica above described in column 2, lines 36–43. The salt makes the silica acceptable to cattle and the silica salt makes the silica acceptable to cattle and the silica thus coated with the salt is readily ingested to provide for a total consumption of silica of up to 3% by weight of the total food intake of each animal.

The term "roughage" as used herein refers to common feedstuffs carrying more than 18% of the dry weight of crude fiber, such as hay, silage and pasturage; other such commonly known feedstuffs are listed at Table Ap-7, page 444 of Applied Animal Nutrition, by E. W. Crampton, W. H. Freeman & Company, San Francisco, 1956, Library of Congress Card No. 56-8595: for hay the fiber content runs upwards of 25% of the dry weight. The terms "carbonaceous concentrate," "concentrated feed" and "high-energy carbohydrate-rich grain" are used synonymously and refer to common grains and their by-products whose protein content does not exceed 16% or their fiber content 18%, such as corn, wheat, sorghum and barley; others included within such common terms are listed at Table Ap-6, page 442 of Applied Animal Nutrition.

It will thus be seen that, according to this invention, new and novel cattle feed and supplements are produced which efficiently satisfy the maintenance and growth needs of cattle in a manner not heretofore provided. These new and novel compositions also produce according to the process of this invention a human feed product, a meat product which, because of the constancy of supply of carbohydrates, fats, proteins, minerals, vitamins and other feed constituents fed in a known chemical composition and in a known physical form to the feed cattle provide as a meat product a beef of composition of novel predictability and constancy of qualities with a minimum of variation.

The carcasses of the cattle fed by the process of the instant invention and the compositions thereof are predictable and consistent in appearance and, in particular, in an extremely white color of the visible fat. Further, the carcasses of cattle fed by the process and compositions of this invention are characterized by a lack of waste fat around the kidneys and by a smoothness of the layer of fat on the back of the animal, such fat is not excessively thick and is evenly laid on the back.

Also, because the feeding process and compositions of this invention eliminate excessive bacterial activity and accumulation and decomposition in the cattle intestines (which usually requires great liver activity), which conditions of activity and accumulation provide products of bacterial decomposition to be carried through the cattle's blood stream and are in part residual after the detoxifying action of the liver, the feeding process and compositions of this invention provide also a meat product of more satisfying flavor and taste from animals of the same stock than have been heretofore available.

The size characteristics of the amorphous silica lend to and facilitate complete mixing with the other components of the feed as by conventional pin mixer. To date approximately 3% by weight of amorphous silica as in Table I provides best results, i.e., better than 2% and better than 4%.

Although, in accordance with the provision of the patent statutes, particular preferred embodiments of this invention have been described and the principles of the invention have been described in the best mode in which it is now contemplated applying such principles, it will be understood that the operations, and compositions and products shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:
1. A feed composition for cattle consisting essentially of a high-energy, carbohydrate-rich concentrate feed grain and round, smooth-surfaced, chemically inert amorphous silica particles of a size between —10 and +50 mesh, supplementary vitamins and minerals and substantially free of conventional roughage.
2. A feed composition for cattle consisting essentially of a high-energy, carbohydrate-rich concentrate feed grain in the amount of 7 to 9 parts by weight, and between 1 and 3 parts by weight of rounded, chemically inert particles of amorphous hydrous silica of a size range between —10 and +50 mesh, supplemented by vitamin concentrates, proteins and mineral concentrates and having a density of about 40 pounds per cubic foot and without conventional roughage.
3. Composition of claim 2 in combination with an aqueous solution of vitamin A.
4. Composition of claim 3 wherein the aqueous solution contains approximately 60 milligrams of ethylene diamine dihydro iodide and 45,000,000 international units of water-soluble vitamin A in 500 gallons of water.
5. A process for feeding cattle comprising the steps of daily providing each of said animals between feedings an aqueous solution containing about 45,000,000 international units of water-soluble vitamin A water until each said animal absorbs approximately 1,000,000 units of vitamin A from said solution while during the same day feeding said animal with a high-energy grain ration consisting essentially of a high-energy, carbohydrate-rich grain and rounded, chemically inert particles of silica of a size between —10 and +50 mesh, supplementary vitamins, proteins and minerals and substantially free of conventional roughage.
6. Process of feeding cattle as in claim 5 wherein the aqueous solution also contains 60 milligrams ethylene diamine dihydro iodide in 500 gallons of water.
7. A cattle feed composition consisting essentially of rounded, chemically inert particles of amorphous hydrous silica of a size range between —10 and +50 mesh, and a flavoring material.
8. Composition as in claim 7 wherein the flavoring material is animal fat and the amount thereof is 10–15% by weight.
9. Composition as in claim 7 wherein the flavoring material is a mixture of NaCl and $MgSO_4$.
10. Composition as in claim 2 wherein said silica is between 2% and 4% by weight of the total weight of said composition.
11. Composition as in claim 2 wherein said silica is 3% by weight of the total weight of the feed.
12. Process as in claim 5 wherein the amount of silica is in the range of 2% and 4% of the total weight of said ration.
13. Process as in claim 6 wherein the amount of silica is approximately 3% of the total weight of said ration.

References Cited by the Applicant
UNITED STATES PATENTS

| | | |
|---|---|---|
| 2,550,015 | 4/1951 | Maffitt. |
| 2,858,215 | 10/1958 | Espoy. |
| 2,879,161 | 3/1959 | Valentine et al. |
| 3,011,943 | 12/1961 | Rogers et al. |
| 3,051,573 | 8/1962 | Kamlet. |

OTHER REFERENCES

Beef Cattle, Their Feeding and Management in the Corn Belt States, R. R. Snapp, 3rd edition, 1949, pp. 286, 337.

Beef Production, Diggins and Bundy, Prentice-Hall, Inc., 1956, p. 88 ff.

Dairy Cattle Feeding and Management, Henderson and Reaves, 4th edition, 1954, pages 74, 80, 81.

"Observations on Relationship of Bloat in Cattle . . .," McNairy, Goetsch et al., Journal of Animal Science, vol. 22, page 6, 1963.

"Results of Cattle Feeding Experiments," Iowa State University, October 1962 (article "Reducing Labor in the Feedlot").

References Cited by the Examiner
UNITED STATES PATENTS

| | | | |
|---|---|---|---|
| 2,685,517 | 8/1954 | Dunmire | 99—2 |
| 2,871,261 | 1/1959 | Klaui | 99—11 |
| 2,965,488 | 12/1960 | Belasco | 99—2 |

OTHER REFERENCES

Morrison et al., Feeds and Feeding, The Morrison Pub. Co., Ithaca, N.Y., 21st ed., 1951, pp. 763, 121, 128, 103 relied on.

Mudd, S. W., Industrial Minerals and Rocks, N.Y., The American Institute of Mining and Metallurgical Engineers, 1949, pp. 569, 570 relied on.

A. LOUIS MONACELL, *Primary Examiner.*

D. DONOVAN, *Assistant Examiner.*